(12) United States Patent
Williams

(10) Patent No.: US 9,522,624 B1
(45) Date of Patent: Dec. 20, 2016

(54) REMOTELY OPERATED VEHICULAR PUSHING APPARATUS

(71) Applicant: Lawrence Clifford Williams, Fresno, CA (US)

(72) Inventor: Lawrence Clifford Williams, Fresno, CA (US)

( * ) Notice: Subject to any disclaimer, the term of this patent is extended or adjusted under 35 U.S.C. 154(b) by 0 days.

(21) Appl. No.: 15/082,706

(22) Filed: Mar. 28, 2016

Related U.S. Application Data

(60) Provisional application No. 62/138,611, filed on Mar. 26, 2015.

(51) Int. Cl.
*B60P 3/07* (2006.01)
*B66F 19/00* (2006.01)
*G05D 1/00* (2006.01)

(52) U.S. Cl.
CPC .............. *B60P 3/07* (2013.01); *B66F 19/00* (2013.01); *G05D 1/0011* (2013.01)

(58) Field of Classification Search
CPC ........... B60P 3/07; B66F 19/00; G05D 1/0011
See application file for complete search history.

(56) References Cited

U.S. PATENT DOCUMENTS

| | | | | |
|---|---|---|---|---|
| 3,831,694 A | * | 8/1974 | MacKew | B60K 1/00 180/19.1 |
| 4,289,212 A | * | 9/1981 | Immel | B60K 1/00 180/19.1 |
| 8,033,346 B2 | * | 10/2011 | Kessler | A63G 25/00 180/6.5 |

* cited by examiner

*Primary Examiner* — John Walters
*Assistant Examiner* — James Triggs
(74) *Attorney, Agent, or Firm* — Plager Schack LLP

(57) ABSTRACT

An apparatus designed to push a vehicle to a desired location with enhanced efficiency and reduce a likelihood of damage to the vehicle is provided. The apparatus includes a housing member, a compressible cushion member coupled to the front face of the housing member, a first pair of wheels coupled to the housing member proximate the front face, a second pair of wheels coupled to a bottom portion of the housing member, and a motor assembly disposed within the housing member and operably connected to the second pair of wheels. The motor assembly includes a motor that drives the second pair of wheels to permit the first pair of wheels to elevate above a ground surface beneath the housing member when the cushion member contacts an end of the vehicle, thereby permitting the apparatus to push the vehicle.

8 Claims, 3 Drawing Sheets

REMOTELY OPERATED VEHICULAR PUSHING APPARATUS

RELATED APPLICATION

The application claims priority to provisional patent application U.S. Ser. No. 62/138,611 filed on Mar. 26, 2015, the entire contents of which is herein incorporated by reference.

BACKGROUND

The embodiments herein relate generally to devices for pushing vehicles including cars, trucks, and the like.

In a variety of circumstances, vehicles need to be pushed from one location to another. This is especially common at auto repair shops and garages. At these locations, vehicles are typically towed to the repair shop and parked outdoors in a lot until a particular vehicle is ready to be serviced. At that time, the vehicle is moved from the parking lot to the interior of the shop and/or garage to perform the repair work. Since many vehicles at the shop are inoperable and/or unable to rely on engine power to move the vehicle, several individuals are required to manually push the vehicle. Specifically, one individual has to steer the vehicle while one or more other individuals push the vehicle. This is inefficient and requires great user effort.

Several vehicle pushing devices with motors exist in the field. For example, several pushing devices are mounted to the rear tires of the vehicle. However, these devices are inefficient because the lug nuts of the vehicle's wheels have to be removed prior to mounting the vehicle pushing device thereon. In addition, these vehicle pushing devices are limited because they cannot accommodate all types of tires in the field. Other vehicle pushing devices are mounted to the vehicle's rear bumper by using clamps and/or mechanical fasteners. However, these devices are undesirable because they can easily damage the vehicle by scratching, creating holes and/or damaging the vehicle's bumper.

As such, there is a need in the industry for an apparatus with enhanced efficiency that effectively pushes a vehicle, and reduces user effort and damage to the vehicle.

SUMMARY

An apparatus configured to push a vehicle to a desired location with enhanced efficiency and reduce a likelihood of damage to the vehicle is provided. The apparatus comprises a housing member comprising a front face, a rear face opposite the front face and a pair of side faces connecting the front and rear faces, a compressible cushion member coupled to the front face of the housing member, a first pair of wheels coupled to the housing member proximate the front face, a second pair of wheels coupled to a bottom portion of the housing member, and a motor assembly disposed within the housing member and operably connected to the second pair of wheels, the motor assembly comprising a motor configured to drive the second pair of wheels, wherein the motor is activated to drive the second pair of wheels to permit the first pair of wheels to elevate above a ground surface beneath the housing member when the cushion member contacts an end of the vehicle, thereby permitting the apparatus to push the vehicle.

BRIEF DESCRIPTION OF THE FIGURES

The detailed description of some embodiments of the invention will be made below with reference to the accompanying figures, wherein the figures disclose one or more embodiments of the present invention.

DETAILED DESCRIPTION OF CERTAIN EMBODIMENTS

Figure 1:
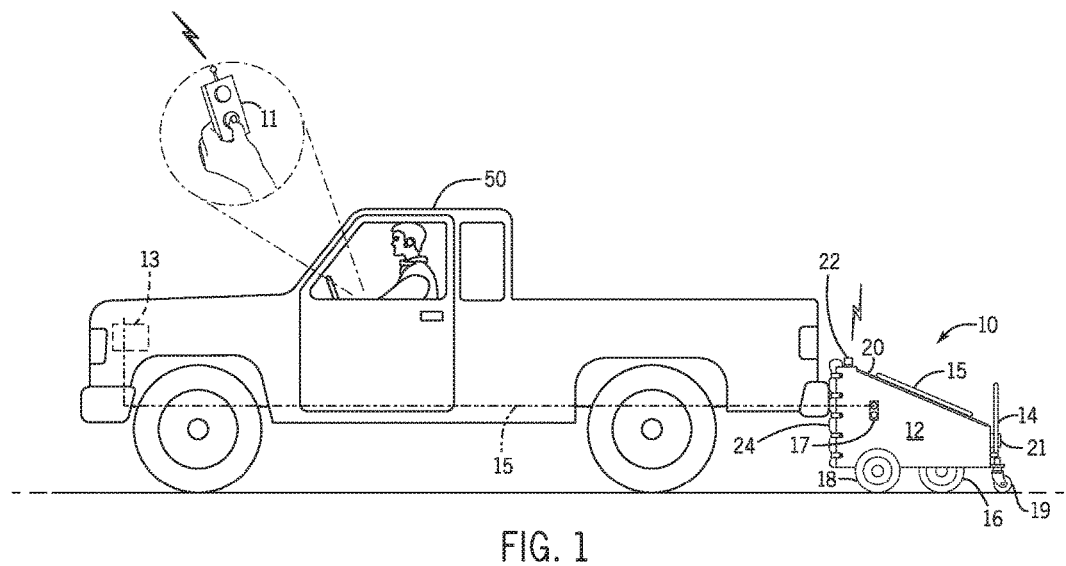
FIG. 1 depicts a side elevation view of certain embodiments of the apparatus in use.
Figure 2:
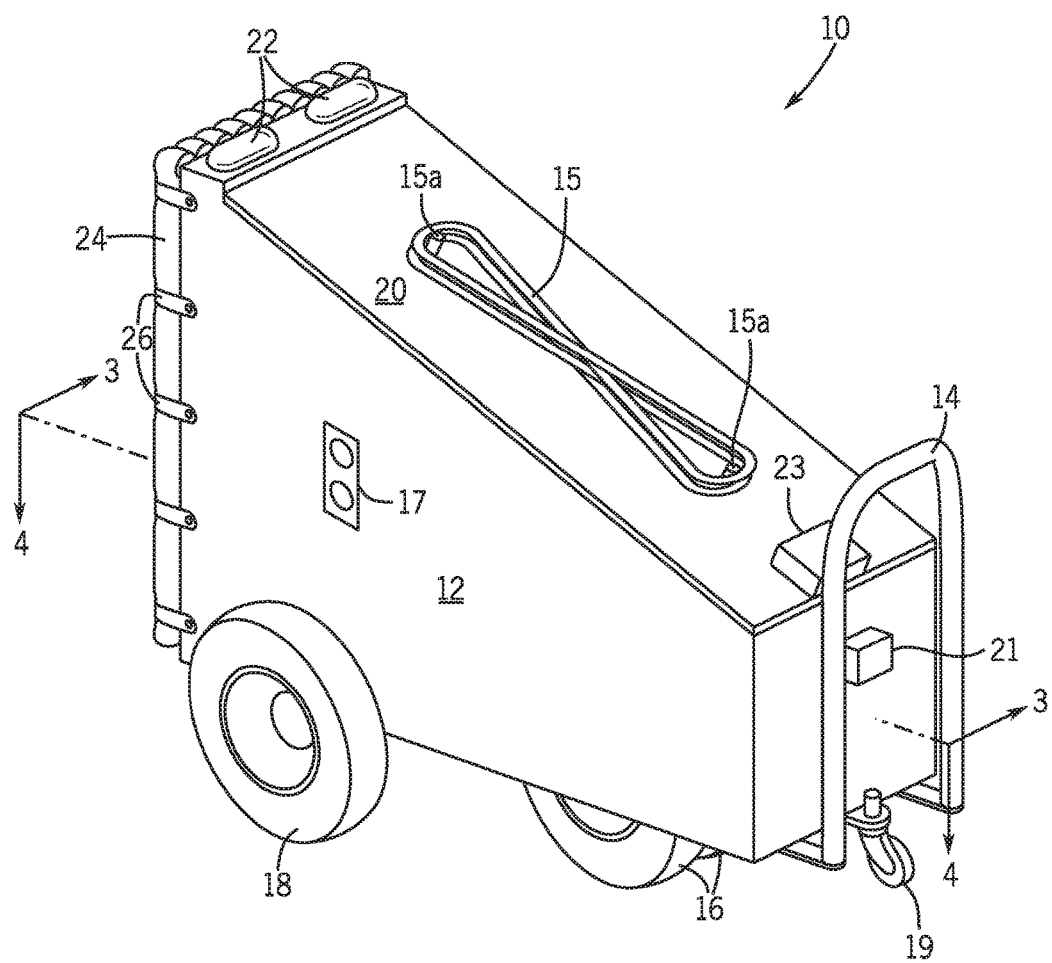
FIG. 2 depicts a perspective view of certain embodiments of the apparatus.

As depicted in FIGS. 1-2, apparatus 10 is configured to push vehicle 50 and be controlled by a user via remote control 11. Apparatus 10 is configured to push a vehicle with a gross weight of up to 7,000 lbs. As shown in the figures, apparatus 10 is configured to contact the rear of vehicle 50 to push the vehicle forward. Alternatively, apparatus 10 may be maneuvered to contact the front of vehicle 50 to push the vehicle backwards. Apparatus 10 generally comprises housing 12, lid 20, non-driving wheels 18, driving wheels 16, spring-loaded caster 19 and a motor assembly disposed within the housing as will be depicted in the other figures.

Figure 3:
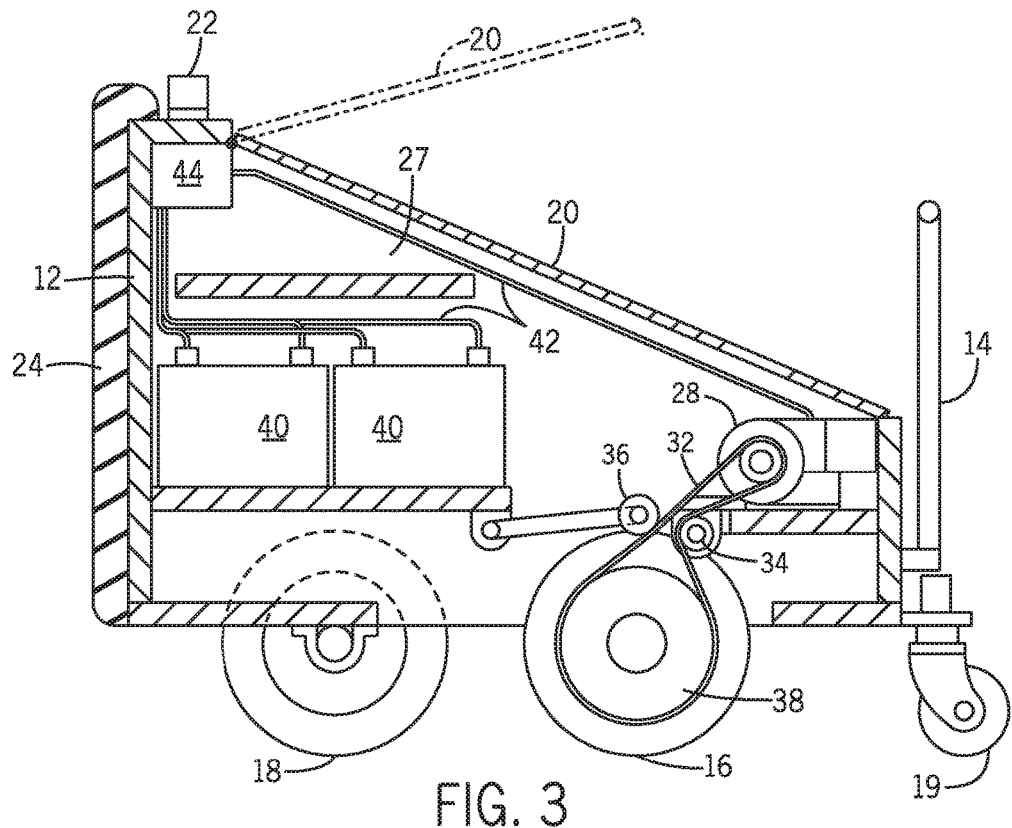
FIG. 3 depicts a section view of certain embodiments of the apparatus taken along line 3-3 in FIG. 2.
Figure 4:
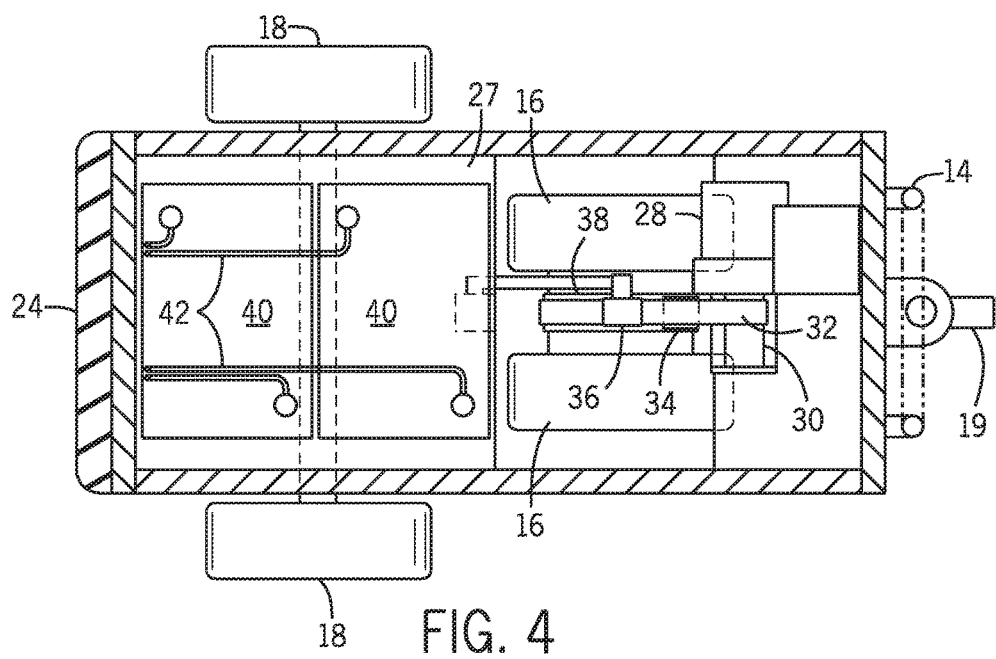
FIG. 4 depicts a section view of certain embodiments of the apparatus taken along line 4-4 in FIG. 2.

As depicted in FIGS. 2-4, housing 12 comprises a front face, rear face, top face and bottom face. Cushion member 24 is coupled to the front face of housing 12 by straps 26. Cushion member 24 is a compressible and resilient foam material approximately 3½" thick and is configured to contact vehicle 50 when in use. Since cushion member 24 is soft and compressible, damage to vehicle 50 including streaks, scratches, holes, or the like, is greatly minimized. Non-driving wheels 18 are rotatably mounted to housing 12 by an axle and are positioned outside the side faces of housing 12. In a preferred embodiment, each non-driving wheel 18 comprises an approximate diameter of 13". However the dimensions of non-driving wheels 18 can vary. Spring-loaded caster 19 is coupled to the bottom face of housing 12 and is configured to swivel as needed when apparatus 10 is in motion on the ground.

Lid 20 is pivotably mounted to the top of housing 12 by a fastening component such as a hinge. As depicted in FIG. 3, the opening of lid 20 exposes inner compartment 27 of housing 12, which is configured to house control box 44, batteries 40, a portion of driving wheels 16 and a motor assembly comprising motor 28, driving pulley 30, idler pulley 34, tensioner pulley 36, driven pulley 38 and belt 32.

Motor 28 is preferably a winch motor with a gearbox. In one embodiment, motor 28 is a 2500 lb winch motor. However, the size and type of motor may vary. Driving pulley 30 comprises an approximate diameter of 1¼" and is operably connected to motor 28. A pair of driving wheels 16 are rotatably mounted to apparatus 10 by an axle (not shown). In a preferred embodiment, each driving wheel 16 comprises an approximate diameter of 10" and is separated from the other driving wheel 16 by approximately 4". Driven pulley 38 comprises an approximate diameter of 8½" and is operably connected to at least one driving wheel 16. Driving pulley 30 and driven pulley 38 are connected by belt 32, which is preferably a serpentine 6-groove belt. The direct connection of driving wheels 16 to motor 28 via belt 32 and pulleys 30, 38 permits motor 28 to rotate driving wheels 16.

Tensioner pulley 36 is coupled to a frame or shelf of housing 12 and is configured to contact a portion of belt 32. Tensioner pulley 36 is a spring-loaded member configured to generate sufficient tension in belt 32 to prevent the belt from separating from driving pulley 30 and driven pulley 38. Idler pulley 34 is coupled to a frame or shelf of housing 12 and is configured to contact a portion of belt 32. Idler pulley 34 is configured to prevent belt 32 from contacting a frame or shelf of housing member 12 to enable the smooth operation of motor 28 and belt 32.

A pair of batteries 40 are disposed on a shelf in inner compartment 27. Each battery 40 is a 12V battery connected in series with the other battery to create a 24V output. Batteries 40 are connected to control box 44 and motor 28 by wiring 42. In one embodiment, battery charger 23 is coupled to lid 20 and electrically coupled to batteries 40. Battery charger 23 is configured to charge batteries 40 when connected to an external power source (not shown) such as an electrical wall outlet.

In one embodiment, external electrical terminal 17 is coupled to a side face of housing 12 and one battery 40. As depicted in FIG. 1, external electrical terminal 17 is configured to be connected to an end of electrical cable 15, which can also be connected to vehicle battery 13 of vehicle 50. Electrical cable 15 permits the transfer of 12V of electricity to vehicle battery 13, which may be desirable if vehicle battery 13 is dead. As depicted in FIG. 2, lid 20 comprises winding pegs 15a, which can be used to store electrical cable 15 when not in use.

In one embodiment, caution lights 22 and tail light 21 are coupled to housing 12 to enable apparatus 10 to be more visible to others. Caution lights 22 and tail light 21 may be powered by batteries 40. In one embodiment, handle 14 is coupled to housing 12 and extends along the rear face of housing 12.

In operation, a user grabs handle 14 to position apparatus 10 near an end of vehicle 50 such as the rear end. As depicted in FIG. 1, cushion member 24 should be facing the end of vehicle 50. The user sits in the driver seat of vehicle 50 to steer the vehicle. With vehicle 50 in neutral gear, the user depresses a button on remote control 11 to activate motor 28 of apparatus 10. In particular, remote control 11 is configured to communicate with control box 44 wirelessly to activate motor 28. In alternative embodiments, remote control 11 may communicate wirelessly directly with motor 28.

Once activated, motor 28 rotates driving pulley 30 and driven pulley 38 via belt 32. The rotation of driven pulley 38 drives driving wheels 16 to permit cushion member 24 to contact the rear end of vehicle 50 such as a bumper. This causes non-driving wheels 18 to elevate above the ground when cushion member 24 contacts vehicle 50. At this time, driving wheels 16 and spring-loaded caster 19 are firmly planted to the ground. Driving wheels 16 continue to be driven by motor 28, which pushes vehicle 50 forward. The user continues to steer vehicle 50 when in motion. Spring-loaded caster 19 pivots and permits apparatus 10 to remain in contact with the end of vehicle 50, even if the vehicle makes any turns. Finally, the user releases the button on remote control 11 to disable motor 28 when vehicle 50 is at the desired location.

In certain circumstances, vehicle 50 may not be able to be placed in neutral gear if the vehicle has no power. In this situation, a first end of electrical cable 15 is connected to external electrical terminal 17 and the second end of electrical cable 15 is connected to vehicle battery 13. This enables one of batteries 40 to provide vehicle 50 with the required power to permit a change of gears, e.g., from park to neutral. Once vehicle 50 is properly in neutral gear, apparatus 10 is operated in the same manner as described above.

It shall be appreciated that the components of apparatus 10 described in several embodiments herein may comprise any alternative known materials in the field and be of any color, size and/or dimensions. It shall be appreciated that the components of apparatus 10 described herein may be manufactured and assembled using any known techniques in the field.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. An apparatus configured to push a vehicle to a desired location with enhanced efficiency and reduce a likelihood of damage to the vehicle, the apparatus comprising:
  a housing member comprising a front face, a rear face opposite the front face and a pair of side faces connecting the front and rear faces;
  a compressible cushion member coupled to the front face of the housing member;
  a first pair of wheels coupled to the housing member proximate the front face;
  a second pair of wheels coupled to a bottom portion of the housing member; and
  a motor assembly disposed within the housing member and operably connected to the second pair of wheels, the motor assembly comprising a motor configured to drive the second pair of wheels, a driving pulley operably connected to the motor, a driven pulley operably connected to the second pair of wheels and coupled to the driving pulley by a belt, a tensioner pulley coupled to the belt and configured to generate sufficient tension in the belt to prevent the belt from separating from the driving pulley and driven pulley, and an idler pulley coupled to the belt and configured to prevent the belt from contacting a frame of the housing member;
  wherein the motor is activated to drive the second pair of wheels to permit the first pair of wheels to elevate above a ground surface beneath the housing member when the cushion member contacts an end of the vehicle, thereby permitting the apparatus to push the vehicle.

2. The apparatus of claim 1, further comprising a spring-loaded caster coupled to the housing member proximate the rear face.

3. The apparatus of claim 2, wherein the front face of the housing member comprises a first height and the rear face of the housing member comprises a second height that is less than the first height.

4. The apparatus of claim 3, further comprising at least one battery disposed within the housing member and operably connected to the motor.

5. The apparatus of claim 4, further comprising a control box disposed within the housing member and operably connected to both the motor and the at least one battery, wherein the control box is configured to communicate with a remote control device that is configured to enable or disable the motor.

6. The apparatus of claim 5, further comprising a lid pivotably mounted to a top portion of the housing member and a pair of pegs coupled to the lid, wherein the pair of pegs is configured to secure an electrical cable.

7. The apparatus of claim 6, further comprising an electrical terminal coupled to one of the side faces of the housing member and operably connected to the at least one battery.

8. The apparatus of claim 7, further comprising a handle coupled to the housing member and extending proximate the rear face.

* * * * *